United States Patent Office 2,894,993
Patented July 14, 1959

2,894,993
INSECTICIDES AND PREPARATION THEREOF

Louis Schmerling, Riverside, Ill., assignor, by mesne assignments, to Universal Oil Products Company, Des Plaines, Ill., a corporation of Delaware No Drawing. Application April 26, 1957
Serial No. 655,196

5 Claims. (Cl. 260—619)

This invention relates to new compositions of matter which may be used as insecticides and to a method for the preparation thereof. More specifically, the invention relates to a method for the preparation of phenolic derivatives of polyhalobicycloalkenes.

An object of this invention is to prepare phenolic derivatives of polyhalobicycloalkenes which may be used as insecticides.

A further object of this invention is to prepare phenolic derivatives of hexachlorobicycloalkenes.

One embodiment of this invention resides in a process for the preparation of a phenolic derivative of a polyhalobicycloalkene which comprises condensing a polyhalocycloalkadiene with an alkenyl phenol, and recovering the resultant condensation product.

A further embodiment of the invention is found in a process for the preparation of a phenolic derivative of a polyhalobicycloalkene which comprises condensing a polyhalocycloalkadiene with an alkenyl phenol at a temperature in the range of from about 80° to about 200° C., and recovering the resultant condensation product.

A specific embodiment of the invention is found in a process for the preparation of a phenolic derivative of a polyhalobicycloalkene which comprises condensing hexachlorocyclopentadiene with o-allylphenol at a temperature in the range of from about 80° to about 200° C., and recovering the resultant 1,2,3,4,7,7-hexachloro-5-(2-hydroxybenzyl)-bicyclo[2.2.1]-2-heptene.

Yet another embodiment of the invention is found in a phenolic derivative of a polyhalobicycloalkene.

Other objects and embodiments referring to alternative polyhalocycloalkadienes and alternative unsaturated alkylphenols will be found in the following further detailed description of the invention.

It has now been discovered that phenolic derivatives of hexachlorobicyclo[2.2.1]-2-heptenes which are prepared by condensing hexachlorocyclopentadiene and an aromatic compound characterized by the fact that said compound contains at least one phenolic hydroxyl group as well as aliphatic unsaturation find a wide variety of uses in the chemical field. For example, the condensation products of hexachlorocyclopentadiene and o-allylphenol may be used as an insecticide, especially against houseflies. In addition the reaction products of this invention may also be used as oxidation inhibitors or as intermediates in the preparation of resins, pharmaceuticals, plastics, etc.

The process of this invention in which a polyhalocycloalkadiene is condensed with an alkenylphenol will take place at a temperature in the range of from about atmospheric to about 250° C. or more, and often preferably at a temperature in the range of from about 80° to about 200° C., the temperature depending upon the activity of the phenolic compound used.

Aromatic compounds which may be used in the process of this invention are those having the general formula:

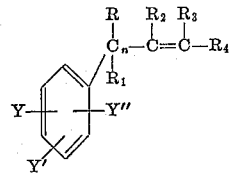

in which the R's independently represent hydrogen or an alkyl radical containing from 1 to about 6 carbon atoms, $n$ is a number from 0 to 6 and Y, Y' and Y" are independently selected from the group consisting of hydrogen, halogen, nitro, amino, hydroxy, cyano or sulfate radicals, at least one of the Y radicals being hydroxy. Suitable organic compounds which may be used include o-vinylphenol, m-vinylphenol, p-vinylphenol, o-allylphenol, m-allylphenol, p-allylphenol, 2-methyl-4-vinylphenol, 3-methyl-4-vinylphenol, 2-ethyl-4-vinylphenol, 3-ethyl-4-vinylphenol, 2,3-dimethyl-4-vinylphenol, 2,3 - diethyl - 4-vinylphenol, 2,6-dimethyl-4-vinylphenol, 2,5-dimethyl-4-vinylphenol, 2,6-diethyl-4-vinylphenol, 2,5-diethyl-4-vinylphenol, 2-methyl-4-allylphenol, 3-methyl-4-allylphenol, 2-ethyl-4-allylphenol, 3-ethyl-4-allylphenol, 2,3-dimethyl-4-allylphenol, 2,3-diethyl-4-allylphenol, 2,6 - dimethyl - 4-allylphenol, 2,5-dimethyl-4-allylphenol, 2,6 - diethyl - 4-allylphenol, 2,5-diethyl-4-allylphenol, 2-chloro - 4 - vinylphenol, 2-bromo-4-vinylphenol, 3-chloro - 4 - vinylphenol, 3-bromo-4-vinylphenol, 2,3-dichloro-4-vinylphenol, 2,3-dibromo-4-vinylphenol, 2,5-dichloro-4-vinylphenol, 2,6-dichloro-4-vinylphenol, 2,5-dibromo-4-vinylphenol, 2,6-dibromo-4-vinylphenol, 2-chloro-4-allylphenol, 2-bromo-4-allylphenol, 3-chloro-4-allylphenol, 3-bromo - 4 - allylphenol, 2,3-dichloro-4-allylphenol, 2,3-dibromo-4-allylphenol, 2,5-dichloro-4-allylphenol, 2,6-dichloro - 4 - allylphenol, 2,6-dichloro-4-allylphenol, 2,5-dibromo - 4 - allylphenol, 2,6-dibromo-4-allylphenol, etc., 2-nitro-4-vinylphenol, 3-nitro-4-vinylphenol, 2,6-dinitro-4-vinylphenol, 2-nitro-4-allylphenol, 3-nitro-4-allylphenol, 2,6-dinitro-4-allylphenol, etc., 2-amino-4-vinylphenol, 3-amino-4-vinylphenol, 2,6-diamino-4-vinylphenol, 2-amino-4-allylphenol, 3-amino-4-allylphenol, 2,6-diamino-4-allylphenol, etc., 2-cyano-4-vinylphenol, 3-cyano-4-vinylphenol, 2,6-dicyano-4-vinylphenol, 2-cyano-4-allylphenol, 3-cyano - 4 - allylphenol, 2,6-dicyano-4-allylphenol, etc., 3-vinylcatechol, 3-allylcatechol, 3-vinyl-4-methylcatechol, 3-allyl-4-methylcatechol, 3-vinyl-4,5-dimethylcatechol, 3-vinyl-4,5-diethylcatechol, 3-allyl-4,5-diethylcatechol, 3-vinyl - 4 - chlorocatechol, 3-allyl-4-chlorocatechol, 3-vinyl - 4,5 - dichlorocatechol, 3-allyl-4,5-dichlorocatechol, 3-vinyl - 4 - bromocatechol, 3-allyl-4-bromocatechol, 3-vinyl - 4,5 - dibromocatechol, 3-allyl-4,5-dibromocatechol, etc., 2-vinylresorcinol, 2-allylresorcinol, etc., o-methallylphenol, m-methallylphenol, p-methallylphenol, 2-methyl - 4 - methallylphenol, 2-ethyl-4-methallylphenol, 2,3-dimethyl-4-methallylphenol, 2,5-dimethyl-4-methallylphenol, 2,5-diethyl-4-methallylphenol, 2-chloro-4-methallylphenol, 2-bromo-4-methallylphenol, 2,3-dichloro - 4 - methallylphenol, 2-nitro-4-methallyphonel, 2,6-dinitro-4-methallylphenol, 2-amino-4-methallylphenol, 2,6-diamino-4-methallylphenol, 3-cyano-4-methallylphenol, 2,6-dicyano - 4 - methallylphenol, 3-methallyl-4-methylcatechol, 3-methallyl - 4,5 - dimethylcatechol, 2-methallylresorcinol, etc., o-crotylphenol, m-crotylphenol, p-crotylphenol, 2-methyl-4-crotylphenol, 2-ethyl-4-crotylphenol, 2,3 - dimethyl - 4 - crotylphenol, 2,5-dimethyl-4-crotylphenol, 2,5-diethyl-4-crotylphenol, 2-chloro-4-crotylphenol, 2-bromo-4-crotylphenol, 2,3-dichloro-4-crotylphenol, 2-nitro-4-crotylphenol, 2,6-dinitro-4-crotylphenol, 2-amino-4-crotylphenol, 2,6-diamino-4-crotylphenol, 3-cyano-4-crotylphenol, 2,6-dicyano-4-crotylphenol, 3-crotyl-4-methylcatechol, 3-crotyl-4,5-dimethylcatechol, 2-crotylresorcinol, etc., the substituted pentenyl-, hexenyl-, heptenyl phenols, etc. It is to be understood that the aforementioned aromatic compounds characterized by containing at least one phenolic hydroxyl group as well as aliphatic ethylenic linkage type unsaturation are only representatives of the class of compounds which may be used and that the process of this invention is not necessarily limited thereto.

Polyhalocycloalkadienes which may be condensed with the aforementioned aromatic compounds include 1,2-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene, 1,2-dibromocyclopentadiene, 1,2,3-tribromocyclopentadiene, 1,2,3,4-tetrabromocyclopentadiene, 1,2,3,4,5-pentabromocyclopentadiene, hexabromocyclopentadiene, 1,2-difluorocyclopentadiene, 1,2,3-trifluorocyclopentadiene, 1,2,3,4-tetrafluorocyclopentadiene, 1,2,3,4,5-pentafluorocyclopentadiene, hexafluorocyclopentadiene, etc. Polyhalo substituted conjugated cyclohexadienes such as 1,2-dichloro-1,3-cyclohexadiene, 1,2,3-dichloro-1,3-cyclohexadiene, octachloro-1,3-cyclohexadiene, etc., 1,2-dibromo-1,3-cyclohexadiene, octabromo-1,3-cyclohexadiene, etc., may also be used. However, the preferred polyhalocycloalkadiene comprises a polyhalocyclopentadiene due to its greater availability and relatively lesser cost. In addition, it is also contemplated within the scope of this invention that the cycloalkadienes which are used in this process may contain more than one species of halogen substituents such as, for example, 1-chloro-2-bromocyclopentadiene, 1,2-dichloro-3-bromocyclopentadiene, 1,2-dichloro-5,5-dibromocyclopentadiene, etc., although the use of these compounds are not necessarily for equivalent results.

An example of the condensation reaction of the present process may be illustrated by the following equation:

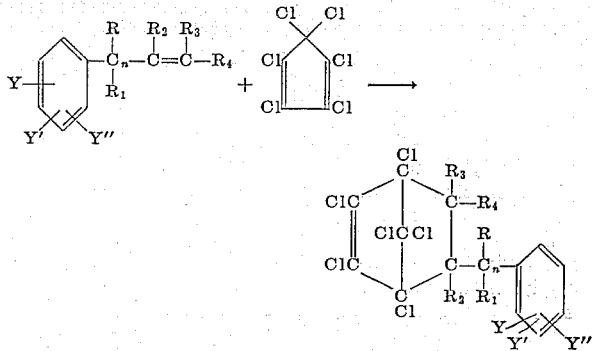

in which hexachlorocyclopentadiene is reacted with an aromatic compound having a phenolic hydroxyl group and an unsaturated alkyl substituent; in which Y, Y' and Y'' are independently selected from the group consisting of hydrogen, halogen, nitro amino, hydroxy, cyano or sulfate radicals, at least one Y radical being hydroxy; R is a hydrogen or an alkyl radical of from 1 to 6 carbon atoms and $n$ is a number of from 0 to 6.

If so desired the process may be effected in the presence of inert organic solvents including alcohols such as methanol and ethanol; aromatic hydrocarbons such as benzene, toluene, xylenes, etc.; or saturated aliphatic hydrocarbons such as pentane, hexane, heptane, etc.

The physical properties of the present phenolic derivatives of polyhalobicycloalkenes and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficient limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecule weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise a batch or continuous type operation. For example, when a batch-type operation is used, a quantity of the starting materials comprising an alkenylphenol, the polyhalo cycloalkadiene and, if so desired, an inert organic solvent are placed in a condensation apparatus provided with heating and mixing means. The flask is heated at the desired temperature for a predetermined time. At the end of this time the flask and contents thereof, are allowed to cool to room temperature and the desired reaction product separated from unreacted starting materials by conventional means such as fractional distillation, crystallization, etc. Alternatively, the alkenylphenol and solvent, if any, may be heated to the desired reaction temperature and the polyhalocycloalkadiene may be added gradually.

Another method of effecting the condensation reaction of the present invention is by a continuous type operation. In this type of operation the starting materials comprising the alkenylphenol and the polyhalocycloalkadiene are continuously charged to a reactor which is maintained in the proper operating conditions of temperature and pressure. The reactor may comprise an unpacked vessel or coil or may contain an adsorbent packing material such as fire brick, alumina, dehydrated bauxite, or the like. If so desired, an inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and purified by conventional means hereinbefore set forth, while the unreacted starting materials are separated and recharged to the reactor as a portion of the feed stock.

The following examples are given to illustrate the process of the present invention which, however, are not intended to limit the generally broad scope of the present invention in strict accordance therewith.

Example I

A solution of 9 g. (0.067 mole) of o-allylphenol and 18 g. (0.067 mole) of hexachlorocyclopentadiene in about 50 g. of toluene was heated under reflux at 120° C. for about twenty minutes after which the toluene was gradually distilled off, permitting the temperature of the solution to rise to 160° C. after about 45 g. of toluene had been removed during two hours. The temperature rose to 173° C. during the next ten minutes without further removal of toluene. The solution which was now dark amber was heated for an additional 30 minutes; removal of an additional 3 grams of toluene caused the final temperature to reach 190° C. The product was allowed to cool, after which it was taken up in pentane, washed with dilute aqueous sodium bicarbonate and water, dried, and fractionally distilled at reduced pressure. The desired product, comprising 1,2,3,4,7,7-hexachloro - 5 - (2 - hydroxybenzyl) - bicyclo[2.2.1] - 2 - heptene, which may also be called 2-(1,4,5,6,7,7-hexachlorobicyclo[2.2.1] - 5 - hepten - 2 - ylmethyl) - phenol or 2 - (1,4,5,6,7,7 - hexachloro - 5 - norbornen - 2 - ylmethyl)-phenol, boiling at 184–188° C. at about 1.1 mm. pressure, was separated therefrom.

The desired product was analyzed with the following results:

Found: C, 41.36; H, 2.76; Cl, 51.75. Calculated for $C_{14}H_{10}Cl_6O$: C, 41.31; H, 2.74; Cl, 52.27.

Example II

A mixture of 27 g. of hexachlorocyclopentadiene and 15 g. of 2-methyl-4-allylphenol is heated at 200° C. for a period of about 1 hour at the end of which time the flask and contents thereof are cooled to room temperature and the reaction product subjected to fractional distillation under reduced pressure. The desired product, comprising 1,2,3,4,7,7-hexachloro-5-(3-methyl-4-hydroxybenzyl)-bicyclo[2.2.1]-2-heptene, is separated therefrom.

Example III

A solution of 27 g. of hexachlorocyclopentadiene and 12 g. of o-vinylphenol in 20 g. of xylene is heated under reflux for 6 hours and the product is treated as described for the product of Examples I and II above. The desired product, comprising 1,2,3,4,7,7-hexachloro-5-(2-hydroxyphenyl)-bicyclo[2.2.1]-2-heptene, is recovered therefrom.

Example IV

A mixture of 25 g. of hexachlorocyclopentadiene and 15 g. of 2,6-dimethyl-4-allylphenol in 50 g. of toluene is treated as described in Example I above. The desired product, comprising 1,2,3,4,7,7 - hexachloro - 5 - (3,5 - dimethyl - 4 - hydroxybenzyl) - bicyclo[2.2.1] - 2 - heptene is recovered by fractional distillation under reduced pressure.

Example V

An insecticidal solution is prepared by dissolving 1 g. of 1,2,3,4,7,7 - hexachloro - 5 - (p - hydroxybenzyl)-bicyclo[2.2.1]-2-heptene in 2 cc. of benzene and adding 100 cc. of water using Triton X–100 as an emulsifying agent. This solution is sprayed into a cage containing common houseflies and causes a 100% knockdown.

I claim as my invention:

1. A compound selected from the group consisting of 1,2,3,4,7,7 - hexachloro - 5 - (2 - hydroxybenzyl) - bicyclo[2.2.1] - 2 - heptene, 1,2,3,4,7,7 - hexachloro - 5 - (2-hydroxyphenyl) - bicyclo[2.2.1] - 2 - heptene, 1,2,3,4,7,7 - hexachloro - 5 - (3 - methyl - 4 - hydroxybenzyl) bicyclo[2.2.1] - 2 - heptene, and 1,2,3,4,7,7 - hexachloro - 5 - (3,5 - dimethyl - 4 -hydroxybenzyl) - bicyclo[2.2.1]-2-heptene.

2. 1,2,3,4,7,7 - hexachloro - 5 - (2 - hydroxybenzyl)-bicyclo[2.2.1]-2-heptene.

3. 1,2,3,4,7,7 - hexachloro - 5 - (2 - hydroxyphenyl)-bicyclo[2.2.1]-2-heptene.

4. 1,2,3,4,7,7 - hexachloro - 5 - (3 - methyl - 4 -hydroxybenzyl)-bicyclo[2.2.1]-2-heptene.

5. 1,2,3,4,7,7 - hexachloro - 5 - (3,5 - dimethyl - 4 - hydroxybenzyl)-bicyclo[2.2.1]-2-heptene.

References Cited in the file of this patent

UNITED STATES PATENTS

| | | |
|---|---|---|
| 2,616,930 | Schmerling | Nov. 4, 1952 |
| 2,673,172 | Polen et al. | Mar. 23, 1954 |
| 2,721,882 | Schmerling | Oct. 25, 1955 |
| 2,795,619 | Goldman | June 11, 1957 |
| 2,799,614 | Mark | July 16, 1957 |
| 2,813,909 | Schmerling | Nov. 19, 1957 |

OTHER REFERENCES

Prill: Jour. Amer. Chem. Soc., vol. 69, pp. 62–63 (1947).

Fields: Jour. Amer. Chem. Soc., vol. 76, pp. 2709–10 (1954).